United States Patent
Kanno et al.

(10) Patent No.: US 8,657,084 B2
(45) Date of Patent: *Feb. 25, 2014

(54) ROTARY DAMPER

(75) Inventors: Hidenori Kanno, Tokyo (JP); Ryota Shimura, Tokyo (JP); Masanori Itagaki, Tokyo (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 420 days.

This patent is subject to a terminal disclaimer.

(21) Appl. No.: 12/888,518

(22) Filed: Sep. 23, 2010

(65) Prior Publication Data

US 2011/0048878 A1 Mar. 3, 2011

Related U.S. Application Data

(62) Division of application No. 10/598,904, filed as application No. PCT/JP2005/006132 on Mar. 30, 2005, now Pat. No. 8,261,894.

(30) Foreign Application Priority Data

Mar. 31, 2004 (JP) .................................. 2004-104793
Oct. 28, 2004 (JP) .................................. 2004-313639

(51) Int. Cl.
*F16D 57/00* (2006.01)
*F16F 9/00* (2006.01)

(52) U.S. Cl.
USPC ............................ 188/290; 188/293; 188/316

(58) Field of Classification Search
USPC ......... 188/130, 290, 293, 294, 306, 307, 308, 188/313, 316; 137/514, 527; 16/53, 58
See application file for complete search history.

(56) References Cited

U.S. PATENT DOCUMENTS

| | | | | |
|---|---|---|---|---|
| 4,893,522 A | * | 1/1990 | Arakawa | 464/180 |
| 5,605,208 A | * | 2/1997 | Friedrichsen et al. | 188/130 |
| 6,336,252 B1 | * | 1/2002 | Bando | 16/307 |
| 8,210,609 B2 | * | 7/2012 | Okimura et al. | 297/216.12 |
| 8,261,894 B2 | * | 9/2012 | Kanno et al. | 188/290 |
| 2003/0177606 A1 | * | 9/2003 | Lee | 16/50 |
| 2011/0011685 A1 | * | 1/2011 | Kanno et al. | 188/290 |

FOREIGN PATENT DOCUMENTS

| | | |
|---|---|---|
| JP | 7-190120 A | 7/1995 |
| JP | 8-270703 A | 10/1996 |
| JP | 9-177858 A | 7/1997 |
| JP | 2003-176844 A | 6/2003 |
| JP | 2004-3584 A | 1/2004 |

* cited by examiner

*Primary Examiner* — Melody Burch
(74) *Attorney, Agent, or Firm* — Cozen O'Connor

(57) ABSTRACT

The present invention provides a rotary damper in which both yields and braking characteristics can be enhanced. The rotary damper of the invention includes a valve mechanism which comprises an operating chamber 7 through which fluid can pass, a valve body 8 which forwardly moves from a natural state position when the valve body 8 receives fluid pressure and which can forwardly moves in the operating chamber 7, and a first spring 9 capable of giving a resistance to the forward movement of the valve body 8. The valve mechanism can reduce a flow rate of fluid which passes through the operating chamber 7 by a flow path 14 formed between the valve body 8 and a peripheral wall 7a of the operating chamber 7. A reducing amount of fluid can be increased as a moving distance of the valve body 8 which forwardly moves in the operating chamber 7 is increased.

5 Claims, 17 Drawing Sheets

(a)  (b)

(a)  (b)

(a)　　　　　　　　　　(b)

(a)　　　　　　　　　(b)

(a)　　　　　　　　　(b)

(a)　　　　　　　　　(b)

(a)  (b)

(a)           (b)

(a)                  (b)

(a)            (b)

(a)            (b)

(a)  (b)

(a)    (b)

(a)             (b)

ROTARY DAMPER

CROSS REFERENCE TO RELATED APPLICATIONS

This application is a divisional of application Ser. No. 10/598,904 filed Sep. 15, 2006 now U.S. Pat. No. 8,261,894 which is a national stage application under 35 U.S.C. §371 of PCT/JP 2005/006132 filed Mar. 30, 2005

TECHNICAL FIELD

The present invention relates to a rotary damper capable of changing a braking force in accordance with variation in load, and to a product having the rotary damper.

BACKGROUND ART

Japanese Patent Application Laid-open No. 2004-3584 discloses a rotary damper in which a valve body comprising a leaf spring is disposed on a vane or a division wall (hereinafter called "vane or the like"), and a flow rate of viscous fluid passing through a fluid passage can be adjusted in accordance with variation in load by the valve body (see paragraphs 0042 to 0053 and FIGS. 7 to 11 of this publication).

One surface of the valve body of the rotary damper is deflected such as to project, the one surface receives fluid pressure and is deformed, and a size of a flow path through which fluid passes can be changed. According to the rotary damper, since the flow rate of fluid passing through the fluid passage can be limited in accordance with a load by the valve body, it is possible to change the braking force in accordance with variation in load.

According to the valve body, however, since a straight distance between an opening of the fluid passage closed with the valve body and the other surface of the valve body opposed to the opening is short, there is a problem that the load range which is to be coped is small. If the load reaches a given value, there is also a problem that the valve body is abruptly deformed and the fluid passage is closed. Further, since the valve body is bent, if the valve bodies are mass-produced, it is not easy to form the valve bodies into uniform shape, and there is a problem that a slight error in shape results in great influence on braking characteristics.

When the valve body is disposed on the vane or the like, it is necessary that the vane or the like has a width (length in the circumferential direction) to a certain extent. When an outer diameter of a casing is large, it is easy to secure the width of the vane or the like on which the valve body can be disposed, but in this case, there is a problem that the installation space of the rotary damper is inevitably increased. On the other hand, to reduce the installation space of the rotary damper, if the outer diameter of the casing is reduced, the width of the vane or the like is reduced to secure the rotation angle of the vane or the like, and there is a problem that it becomes difficult to provide the valve body.

Patent Document 1: Japanese Patent Application Laid-open No. 2004-3584

DISCLOSURE OF THE INVENTION

Problem to the Solved by the Invention

It is an object of the present invention to provide a rotary damper having enhanced yield and enhanced braking characteristics, and to provide a product having the rotary damper. Further, it is an object of the present invention to provide a rotary damper in which a rotation angle of a vane or the like can sufficiently be secured and an outer diameter of a casing can be reduced, and to provide a product having the rotary damper.

Means for Solving the Problem

To solve the above problems, the present invention provides the following rotary damper and product.

1. A rotary damper comprising an operating chamber through which fluid can pass, a valve body which forwardly moves from a natural state position when the valve body receives fluid pressure and which can forwardly moves in the operating chamber, and a first spring capable of giving a resistance to the forward movement of the valve body, wherein a flow rate of fluid which passes through the operating chamber can be reduced by a flow path formed between a peripheral wall of the operating chamber and the valve body, the rotary damper further comprises a valve mechanism capable of increasing a reducing amount of the fluid as a moving distance of the valve body which forwardly moves in the operating chamber is increased.

2. The rotary damper according to the item 1, wherein the valve mechanism can increase the reducing amount by increasing a length of the flow path as the moving distance of the valve body which forwardly moves in the operating chamber is increased.

3. The rotary damper according to the item 1, wherein the valve mechanism can increase the reducing amount by reducing an area of the flow path as the moving distance of the valve body which forwardly moves in the operating chamber is increased.

4. The rotary damper according to the item 1, wherein when fluid pressure which forwardly moves the valve body is less than a predetermined value, the valve mechanism can increase the reducing amount by reducing an area of the flow path as the moving distance of the valve body which forwardly moves in the operating chamber is increased, and when the fluid pressure which forwardly moves the valve body is equal to or higher than the predetermined value, the valve mechanism can increase the reducing amount by increasing a length of the flow path as the moving distance of the valve body which forwardly moves in the operating chamber is increased.

5. The rotary damper according to the item 1, wherein if the valve body receives the fluid pressure, the valve body can retreat from the natural state position, the valve mechanism includes a second spring capable of returning the valve body which retreated from the natural state position to the natural state position.

6. The rotary damper according to the item 1, wherein the valve mechanism is provided on a shaft around which a pushing member which pushes the fluid by rotational motion or a partitioning member is provided, the partitioning member partitions a space into which fluid is charged together with the pushing member.

7. The rotary damper according to the item 1, wherein the valve mechanism is provided on a pushing member which pushes the fluid by rotational motion or on a partitioning member which partitions a space into which fluid is charged together with the pushing member.

8. A product comprising a movable body and a rotary damper which controls motion of the movable body, wherein the rotary damper is that described in any one of the items 1 to 7.

Effect of the Invention

According to the invention described in the item 1, it is possible to enlarge the range of load to be coped, and to exhibit a braking force which appropriately corresponds to variation in load. Even when the rotary dampers are mass-produced, since it is possible to employ, as valve mechanisms, valve bodies whose shape and size can easily be worked precisely, yields can be enhanced.

According to the invention described in the items 2 and 3, the same effect as that of the invention of the item 1 can be obtained.

According to the invention described in the item 4, even when the load is varied, when the load is less than the predetermined value, the braking force can be reduced and when the load is equal to or higher than the predetermined value, the braking force can be increased.

According to the invention described in the item 5, when fluid reversely flows in the operating chamber, the braking force can be reduced to an extremely small value.

According to the invention described in the item 6, it is possible to reduce the outer diameter of the casing without reducing the rotation angle of the pushing member.

According to the invention described in the item 7, the same effect as that described in the item 1 can be obtained.

According to the invention described in the item 8, even if the weight of the movable body is varied and a load on the rotary damper is largely varied, it is possible to operate the movable body without largely varying the operating speed of the movable body.

BRIEF DESCRIPTION OF THE DRAWINGS

FIGS. 8(a) and 8(b) are diagrams used for explaining the function of the rotary damper of the first embodiment, wherein FIG. 8(a) is a schematic sectional view and FIG. 8(b) is a sectional view taken along the line A-A in FIG. 8(a);

FIGS. 10(a) and 10(b) are diagrams used for explaining the function of the rotary damper of the first embodiment, wherein FIG. 10(a) is a schematic sectional view and FIG. 10(b) is a sectional view taken along the line A-A in FIG. 10(a);

FIGS. 11(a) and 11(b) are diagrams used for explaining the function of the rotary damper of the first embodiment, wherein FIG. 11(a) is a schematic sectional view and FIG. 11(b) is a sectional view taken along the line A-A in FIG. 11(a);

FIGS. 14(a) and 14(b) are diagrams showing a valve mechanism employed in a rotary damper of a second embodiment of the present invention, wherein FIG. 14(a) is a schematic sectional view and FIG. 14(b) is a sectional view taken along the line A-A in FIG. 14(a);

FIGS. 15(a) and 15(b) are diagrams used for explaining the function of the valve mechanism employed in the rotary damper of the second embodiment, wherein FIG. 15(a) is a schematic sectional view and FIG. 15(b) is a sectional view taken along the line A-A in FIG. 15(a);

FIGS. 16(a) and 16(b) are diagrams showing a valve body employed in a rotary damper of a third embodiment of the present invention, wherein FIG. 16(a) is a plan view and FIG. 16(b) is a sectional view taken along the line A-A in FIG. 16(a);

FIGS. 17(a) and 17(b) are diagrams showing a valve body employed in a rotary damper of a fourth embodiment of the present invention, wherein FIG. 17(a) is a plan view and FIG. 17(b) is a sectional view taken along the line A-A in FIG. 17(a);

FIGS. 20(a) and 20(b) are diagrams showing a valve body employed in the fifth embodiment, wherein FIG. 20(a) is a front view and FIG. 20(b) is a right side view;

FIGS. 24(a) and 24(b) are diagrams showing a valve body employed in a rotary damper of a sixth embodiment of the present invention, wherein FIG. 24(a) is a front view and FIG. 24(b) is a right side view;

FIGS. 26(a) and 26(b) are diagrams showing a valve body employed in a rotary damper of a seventh embodiment of the present invention, wherein FIG. 26(a) is a front view and FIG. 26(b) is a sectional view taken along the line A-A in FIG. 26(a);

FIGS. 30(a) and 30(b) are diagrams showing a valve body employed in a rotary damper of a ninth embodiment of the present invention, wherein FIG. 29(a) is a front view and FIG. 29(b) is a sectional view taken along the line A-A in FIG. 29(a);

Figure 1:
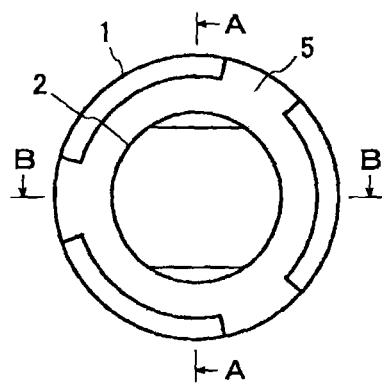
FIG. 1 is a plan view of a rotary damper according to a first embodiment of the present invention.

DESCRIPTION OF REFERENCE NUMERALS 1 casing
1a recess
1b outer wall
1c end wall
1d inner wall
2 shaft
2a hole
3 vane
4 division wall
5 lid
5a projection piece
6a to 6d first chamber to fourth chamber
7 operating chamber
7a peripheral wall
8 valve body
8a flat surface
8b tapered surface
8c, 8d, 8h groove
8e large-diameter portion
8f small-diameter portion
8g projection portion
8r R
9 first spring
10 second spring
11 valve chamber
12 first passage
13 second passage
14 flow path
15 box body
16 flange
17 projection
18 support member
19 O-ring

BEST MODE FOR CARRYING OUT THE INVENTION

A rotary damper according to the present invention includes a valve mechanism. The valve mechanism includes an operating chamber, a valve body and a first spring.

The operating chamber is formed such that fluid can pass through the operating chamber. Viscous fluid such as silicon oil is used as fluid.

The valve body is provided such that if the valve body receives fluid pressure, the valve body moves forward from a natural state position and the valve body can move forward in the operating chamber. Here, the natural state position is a position where the valve body exists when no load is applied. If the valve body exists in the operating chamber, a gap is formed between the valve body and a peripheral wall of the operating chamber, and this gap functions as a flow path. By reducing an area of the gap, the flow path includes a function for reducing the flow rate of fluid passing through the operating chamber. The flow path may already be formed between the valve body and the peripheral wall of the operating chamber or may not be formed therebetween yet in a natural state. In the latter case, if the valve body moves forward from the natural state position and enters into the operating chamber, the flow path is formed. The natural state is a state where no load is applied.

The first spring is provided such that the first spring can give a resistance to the forward movement of the valve body. By providing the first spring, pressure of the first spring is directly or indirectly given to the valve body as a resistance when the valve body moves forward. As a result, a forward moving distance of the valve body from the natural state position is varied depending upon the magnitude of fluid pressure which moves the valve body forward. That is, the moving distance of the valve body is increased as the fluid pressure is greater. A case in which the valve body abruptly moves forward irrespective of the fact that the fluid pressure is constant is suppressed.

The valve mechanism is set such that the valve mechanism can reduce a flow rate of fluid passing through the operating chamber by the flow path formed between the valve body and the peripheral wall of the operating chamber. Also, the valve mechanism is set such that the reducing amount can be increased by increasing the moving distance of the valve body which forwardly moves in the operating chamber. As the fluid pressure is greater, the moving distance of the valve body is increased as described above. Therefore, the reducing amount is also increased as the fluid pressure is greater. Here, the fluid pressure is generated when a pushing member which presses fluid by rotational motion pushes the fluid. As a load against the rotary damper is greater, the pushing member pushes the fluid stronger. Therefore, the fluid pressure which moves the valve body forward is increased as the load is greater. As the reducing amount is increased, the resistance of fluid pushed by the pushing member is increased and thus, the braking force exhibited by the rotary damper is also increased. Since the rotary damper of the present invention has the valve mechanism, the rotary damper can change the braking force in accordance with variation in load.

The valve mechanism is set such that as the moving distance of the valve body which forwardly moves in the operating chamber is increased, the reducing amount is increased. Thus, it is possible to enlarge the range of load to be coped as compared with a conventional valve mechanism in which the reducing amount is increased as the deformation amount of the valve body is increased. That is, in the conventional valve mechanism, since the valve body is deformed only by an amount corresponding to the straight distance between the other surface of the valve body and the opening of the fluid passage, the range of load to be coped is inevitably small even if the reducing amount is increased as the deformation amount of the valve body is increased. It is difficult, in terms of structure, to increase the straight distance between the other surface of the valve body and the opening of the fluid passage. On the other hand, in the present invention, the reducing amount of fluid is increased as the moving distance of the valve body is increased, and it is easy, in terms of structure, to increase the moving distance of the valve body to a level greater than the straight distance corresponding to the deformation amount of the conventional valve body and thus, it is possible to remarkably enlarge the range of load to be coped as compared with the conventional technique.

In the conventional valve body, if the fluid pressure reaches a constant value, the valve body is abruptly deformed and the fluid passage is closed in some cases. In the present invention, however, the reducing amount is increased as the moving distance of the valve body which forwardly moves in the operating chamber is increased while receiving the resistance of the first spring and thus, the above problem is not produced. Thus, according to the present invention, braking force appropriately corresponding to the variation in load can be exhibited.

As a concrete modes for increasing the reducing amount as the moving distance of the valve body which forwardly moves in the operating chamber is increased, any of the following three modes can be employed.

1) The length of the flow path is increased as the moving distance of the valve body which forwardly moves in the operating chamber is increased, thereby increasing the reducing amount.

In this mode, an area of the flow path is constant even if the moving distance of the valve body which forwardly moves in the operating chamber is increased, but as the length of the flow path is increased, it becomes more difficult for fluid to flow and thus, the reducing amount is increased.

2) The area of the flow path is reduced as the moving distance of the valve body which forwardly moves in the operating chamber is increased, thereby increasing the reducing amount.

In this mode, a length of the flow path is constant even if the moving distance of the valve body which forwardly moves in the operating chamber is increased, but as the area of the flow path is reduced, it becomes more difficult for fluid to flow and thus, the reducing amount is increased.

3) When the fluid pressure which moves the valve body forward is less than a predetermined value, the area of the flow path is reduced as the moving distance of the valve body which forwardly moves in the operating chamber is increased, thereby increasing the reducing amount, and when the fluid pressure which moves the valve body forward is equal to or greater than the predetermined value, the length of the flow path is increased as the moving distance of the valve body which forwardly moves in the operating chamber is increased, thereby increasing the reducing amount.

According to this mode, when the fluid pressure which moves the valve body forward is less than a predetermined value, the area of the flow path is reduced as the moving distance of the valve body which forwardly moves in the operating chamber is increased, thereby increasing the reducing amount. Here, the area of the flow path means an area of an opening surface forming the flow path, and the length of the flow path when the area of the flow path is reduced is the length required for forming the opening surface, and is extremely short. Therefore, when the area of the flow path is to be reduced, the fluid easily flows as compared with a case where the length of the flow path is increased. Therefore, when the fluid pressure which moves the valve body forward is less than the predetermined value (low load), a braking force corresponding to the variation in load is exhibited, but the braking force can be substantially small. On the other hand, when the fluid pressure which moves the valve body forward is equal to or higher than the predetermined value, the length of the flow path is increased as the moving distance of the valve body which forwardly moves in the operating chamber is increased, thereby increasing the reducing amount. Here, the length of the flow path means a length, in the direction of travel of the valve body, of the gap formed between the valve body and the peripheral wall of the operating chamber. In this case, since the area of the flow path is originally small so that the flow rate of the fluid can be reduced, when the length of the flow path is increased, the fluid can not easily flow as compared with a case in which the area of the flow path is reduced. Therefore, when the fluid pressure which moves the valve body forward is equal to or higher than the predetermined value (high load), a braking force corresponding to variation in load is exhibited, but the braking force can be increased substantially.

According to the rotary damper of the present invention also includes a so-called two-way rotary damper in which even when fluid flows not only in one direction in the operating chamber, but also in the opposite direction, the braking force is exhibited. The valve body receives the fluid pressure so that the valve body can retreat from the natural state position, and the valve mechanism includes a second spring capable of returning the valve body retreated from the natural state position to the natural state position. With this, the rotary damper can be a so-called one-way rotary damper in which a braking force is exhibited only when fluid flows in one direction in the operating chamber.

In this mode, if the valve body retreats from the natural state position, the length of the flow path is reduced or the area of the flow path is increased, and the function of the flow path for reducing the flow rate of fluid is deteriorated or the flow path itself is eliminated, and it becomes impossible to reduce the flow rate of fluid. Therefore, when the fluid flows in the opposite direction in the operating chamber, it is possible to reduce the braking force to an extremely small value.

The above-described valve mechanism may be provided on one of a shaft, a pushing member or a partitioning member.

The pushing member rotates around the shaft. The shaft may rotate or may not rotate. The pushing member or the partitioning member is provided around the shaft.

Figure 5:
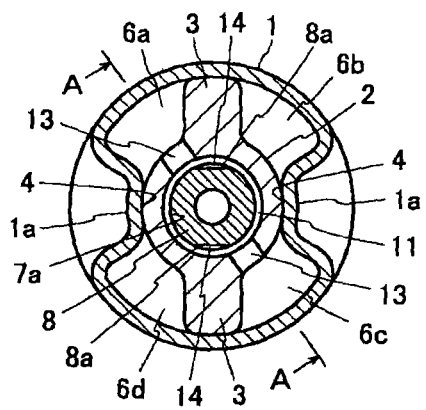
FIG. 5 is a sectional view taken along the line B-B in FIG. 2.
Figure 6:
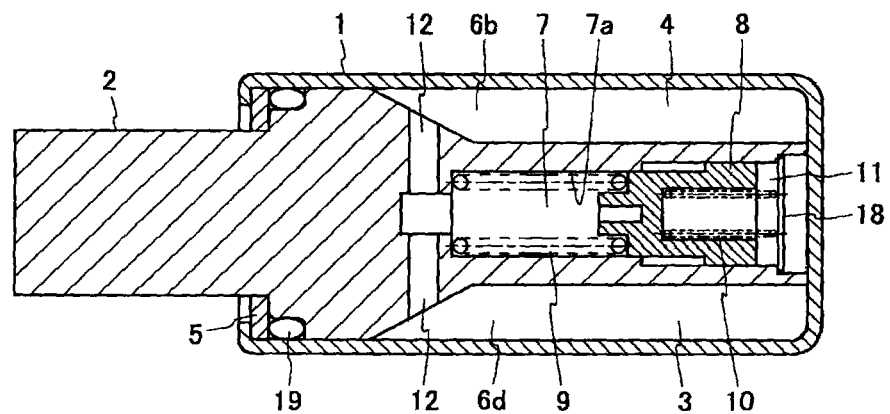
FIG. 6 is a sectional view taken along the line A-A in FIG. 4.
Figure 7:
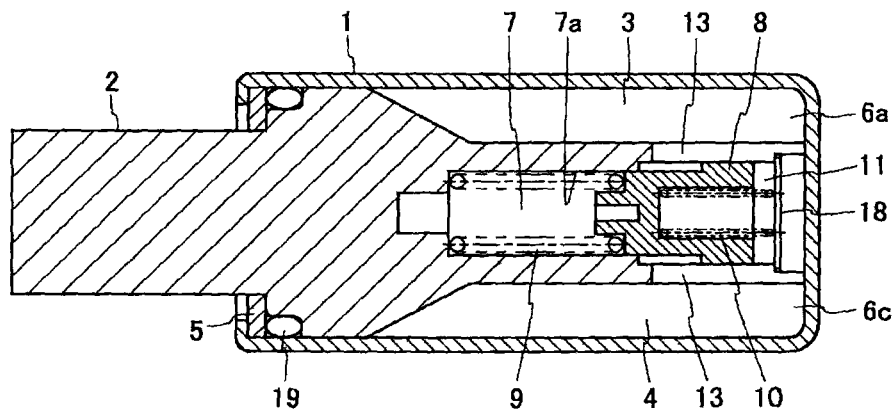
FIG. 7 is a sectional view taken along the line A-A in FIG. 5.
Figure 8:
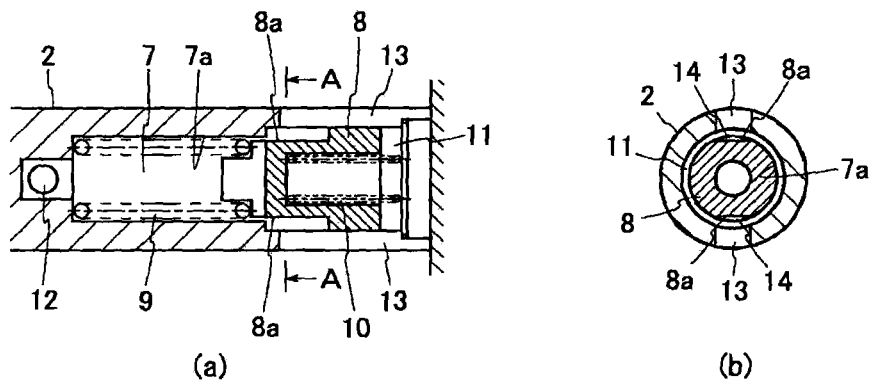

Here, the pushing member pushes fluid by rotational motion. As shown in FIG. 5 for example, a rotary damper which includes vanes 3 and division walls 4 disposed such as to divide a space formed between a casing 1 and a shaft 2. In the rotary damper, when the vanes 3 are rotated and fluid is pushed by the vanes 3, the vanes 3 correspond to the pushing member. On the other hand, when the division walls 4 are rotated and fluid is pushed by the division walls 4, the division walls 4 correspond to the pushing member.

The partitioning member partitions a space into which fluid is charged together with the pushing member. As shown in FIG. 5 for example, in the rotary damper having the vanes 3 and the division walls 4 disposed such as to divide the space formed between the casing 1 and the shaft 2, when the vanes 3 rotate and fluid is pushed by the vanes 3, the vanes 3 correspond to the pushing member, and the division walls 4 correspond to the partitioning member. On the other hand, when the division walls 4 rotate and fluid is pushed by the division walls 4, the division walls 4 correspond to the pushing member, and the vanes 3 correspond to the partitioning member.

In the structure in which the pushing member or the partitioning member is provided with the valve mechanism, in order to secure an installation space for the valve mechanism, a radial length of the pushing member or partitioning member is increased or the widths (lengths in the circumferential direction) of the pushing member and the partitioning member are increased and as a result, the outer diameter of the casing is increased and the rotation angle of the pushing member is reduced.

If the valve mechanism is provided on the shaft, it is possible to shorten the radial length of the pushing member or partitioning member, and to reduce the widths (lengths in the circumferential direction) of the pushing member and the partitioning member. Therefore, it is possible to sufficiently secure the rotation angle of the pushing member and to reduce the outer diameter of the casing.

In a further preferred mode of the rotary damper of the present invention, the rotary damper is further provided with a coupling section which appears outside of the casing. The coupling section is a recess formed in a portion of the rotary damper where the pushing member or partitioning member is to be formed by integrally forming the casing and the pushing member or partitioning member by presswork. If the rotary damper has such a coupling section, it is possible to couple the rotary damper to a portion of a produce without the need for a member which transmits external force to the rotary damper such as an arm or a gear. Since such a transmitting member is not interposed, mechanical play can be reduced.

A product of the present invention comprises a movable body and a rotary damper which controls motion of the movable body. The movable body is not limited to one which moves rotational motion, and a movable body may move straightly. As a rotary damper, one having the above-described valve mechanism is used.

According to the product of the present invention, even if the weight of the movable body is varied and a load against the rotary damper is largely varied, the movable body can be moved without largely varying the moving speed of the movable body due to a function of the valve mechanism.

Typical examples of the product of the present invention are a glove box or a console box disposed in an automobile.

First Embodiment

FIGS. 1 to 7 show a rotary damper according to a first embodiment of the present invention. As shown in these drawings, the rotary damper of the embodiment includes a casing 1, a shaft 2, vanes 3, division walls 4 and a valve mechanism.

The casing 1 is hollow, one end thereof is opened and the other end is closed. The opening of the casing 1 is closed with a lid 5. The lid 5 is mounted by crimping an end of the casing 1. The casing 1 includes division walls 4 which divide a space formed between the casing 1 and the shaft 2. The casing 1 and the division walls 4 are integrally formed by press working. Recesses 1a are formed in division wall forming sections. The recess 1a functions as the coupling section (see FIGS. 3 to 5). Viscous fluid such as silicon oil is charged into the casing 1.

The shaft 2 is provided in the casing 1 such that the shaft 2 can rotate relative to the casing 1. The shaft 2 is integrally formed with the vanes 3. Four chambers 6a to 6d (a first chamber 6a to a fourth chamber 6d, hereinafter) are formed in the casing 1. The chambers 6a to 6d are divided by the division walls 4 and the vanes 3.

The valve mechanism is provided in the shaft 2. The valve mechanism of this embodiment includes an operating chamber 7, a valve body 8, a first spring 9 and a second spring 10.

The operating chamber 7 is formed adjacent to a valve chamber 11 in which the valve body 8 is accommodated. The operating chamber 7 and the valve chamber 11 are holes having circular cross sections. The valve chamber 11 has an inner diameter greater than that of the operating chamber 7. The operating chamber 7 is in communication with the second chamber 6b and the fourth chamber 6d through a first passage 12, and is in communication with the first chamber 6a and the third chamber 6c through the valve chamber 11 and a second passage 13 (see FIGS. 4 and 5). The first passage 12 is a hole having a circular cross section. The second passage 13 is formed into a slit-shape having a predetermined length along the shaft 2 so as to secure a flow path of fluid (see FIG. 7).

The valve body 8 is accommodated in the valve chamber 11 such that the valve body 8 can move along the shaft 2. The valve body 8 is formed at its outer periphery with a flat surface 8a. When the valve body 8 forwardly moves from the natural state position and enters into the operating chamber 7 and the flat surface 8a formed on the valve body 8 and a wall surface of a peripheral wall 7a of the operating chamber 7 are opposed to each other, a flow path 14 is formed therebetween. The flow path 14 is designed such that the flow path 14 reduces the flow rate of fluid passing through the operating chamber 7.

The first spring 9 is provided in the operating chamber 7 for giving a resistance to the valve body 8 which forwardly moves. The first spring 9 comprises a compression coil spring, and is compressed when the valve body 8 forwardly moves. The pressure of the first spring 9 generated at that time is given to the valve body 8. Thus, the moving distance of the valve body 8 which forwardly moves from the natural state position is varied in accordance with magnitude of the fluid pressure which forwardly moves the valve body 8. A case in which the valve body 8 is abruptly forwardly moves although the fluid pressure is constant is suppressed.

Figure 2:
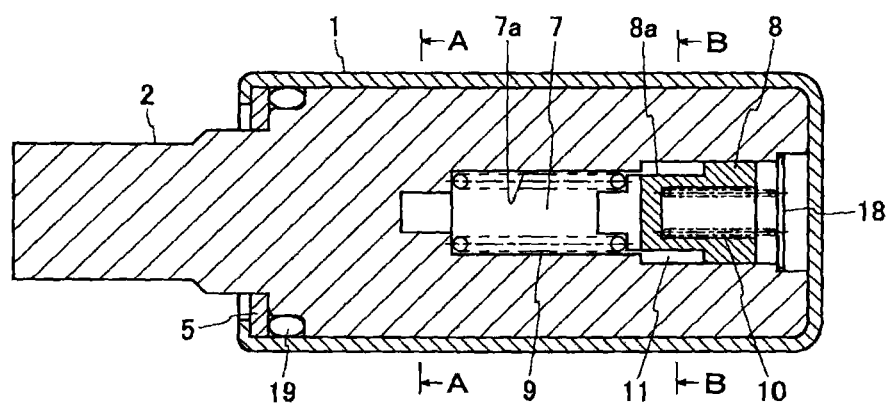
FIG. 2 is a sectional view taken along the line A-A in FIG. 1.
Figure 3:
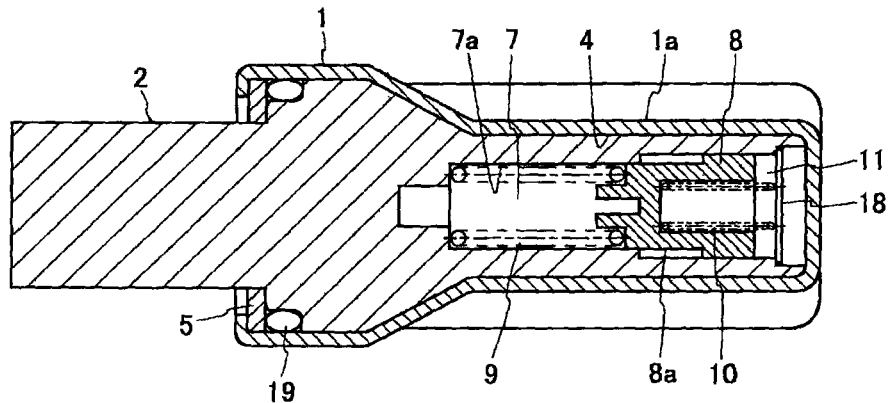
FIG. 3 is a sectional view taken along the line B-B in FIG. 1.

The valve body 8 of the embodiment provided such that the valve body 8 can retreat from the natural state position. FIG. 2 shows a state where the valve body 8 is in the natural state position. The second spring 10 returns the valve body 8 which retreats from the natural state position to the natural state position. The second spring 10 comprises a compression coil spring. If the valve body 8 retreats from the natural state position, the second spring 10 is compressed. By discharging distortion energy accumulated at that time, the second spring 10 can return the valve body 8 to the natural state position.

Next, the operation of the rotary damper of the embodiment will be explained. For convenience sake of explanation, configurations of the first passage 12 and the second passage 13 shown in FIGS. 8 to 11 are different from configurations of the first passage 12 and the second passage 13 shown in FIGS. 4 to 7.

According to the rotary damper of the embodiment, when the casing 1 is non-rotatably fixed and the shaft 2 is connected to the movable body which is to be controlled, the shaft 2 rotates with the rotational motion of the movable body.

Figure 4:
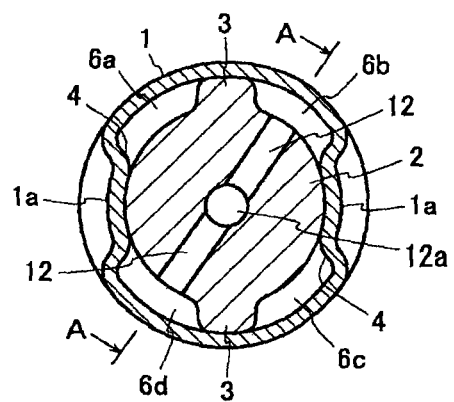
FIG. 4 is a sectional view taken along the line A-A in FIG. 2.
Figure 9:
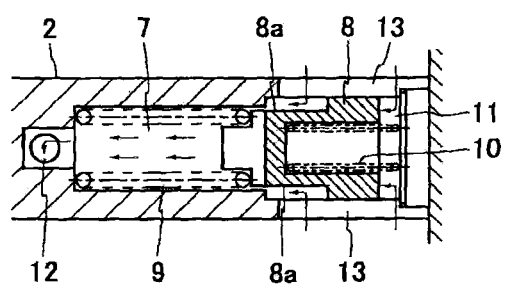
FIG. 9 is a diagram used for explaining the function of the rotary damper of the first embodiment.

If the shaft 2 rotates in the counterclockwise direction in FIGS. 4 and 5, fluid in the first chamber 6a and third chamber 6c is pressed by the vanes 3, and the fluid flows into the operating chamber 7 through the second passage 13 and the valve chamber 11. FIG. 9 shows, with arrows, the flow of fluid passing through the operating chamber 7 at that time. As shown in FIG. 9, the fluid at that time flows not only to a portion behind the valve body 8 but also to a portion around the valve body 8 through the second passage 13. The valve body 8 receives pressure of fluid which flows behind the valve body 8 and moves forward, but since the valve body 8 also receives a resistance from the first spring 9, its moving distance is varied in accordance with the load. That is, if the load is increased, the fluid pressure which forwardly moves the valve body 8 is also increased and thus, the first spring 9 is largely compressed and the moving distance of the valve body 8 is increased. On the other hand, if the load is small, the fluid pressure which forwardly moves the valve body 8 is also reduced and thus, the compression of the first spring 9 is small and the moving distance of the valve body 8 is reduced.

Figure 10:
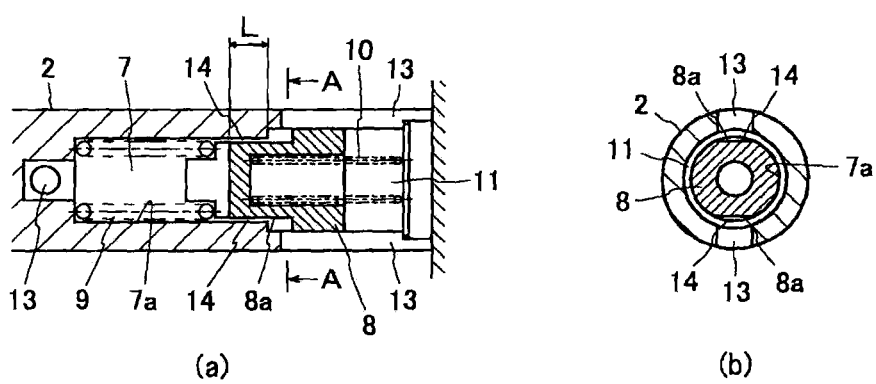

As shown in FIG. 10, if the valve body 8 forwardly moves, the flow path 14 is formed between the flat surface 8a formed on the valve body 8 and the wall surface of the peripheral wall 7a of the operating chamber 7. Since the moving distance of the valve body 8 is varied in correspondence with the variation in load, the length L of the flow path 14 is also varied in correspondence with the variation in load. As the length L of the flow path 14 is increased, it becomes more difficult for fluid to flow, and the resistance of fluid pressed by the vanes 3 is increased. Therefore, according to the rotary damper of the embodiment, when the load is great, great braking force can be exhibited, and when the load is small, small braking force is exhibited. Fluid which passed through the operating chamber 7 flows into the second chamber 6b and the fourth chamber 6d through the first passage 12.

Figure 12:
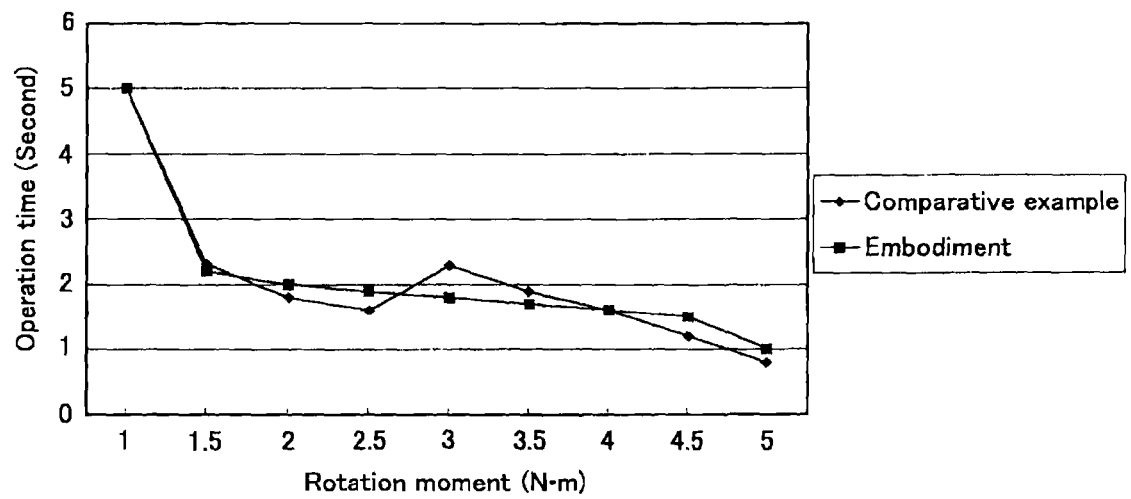
FIG. 12 is a graph for comparison between braking characteristics of the rotary damper of the first embodiment and braking characteristics of a conventional rotary damper (comparative example)

FIG. 12 is a graph showing a comparison between braking characteristics of the rotary damper (embodiment) according to the embodiment and braking characteristics of a conventional rotary damper (comparative example) having a valve body comprising a leaf spring. A vertical axis shows operation time when the movable body which is to be controlled rotates through a given angle, and a horizontal axis shows rotation moment of the movable body.

As shown in this graph, in the comparative example, since the straight distance during which the valve body is fully closed from its fully opened state is short, a range of load to be coped is as small as 1.5 to 2.5N·m. In the embodiment, on the other hand, since the straight distance during which the valve body 8 forwardly moves from the fully opened state to the fully closed state is much longer than that of the comparative example, a range of load to be coped is as great as 1.5 to 4.5N·m.

In the comparative example, the valve body is abruptly deformed to close the fluid passage when the load reaches 3N·m. Therefore, the operation time of the movable body which is to be controlled is abruptly increased at that time point. In the embodiment, the valve body 8 forwardly moves in the operating chamber 7, thereby increasing the length of the flow path 14. Therefore, the operation time of the movable body which is to be controlled is not abruptly increased, and braking force which appropriately corresponding to the variation in load can be exhibited.

Figure 11:
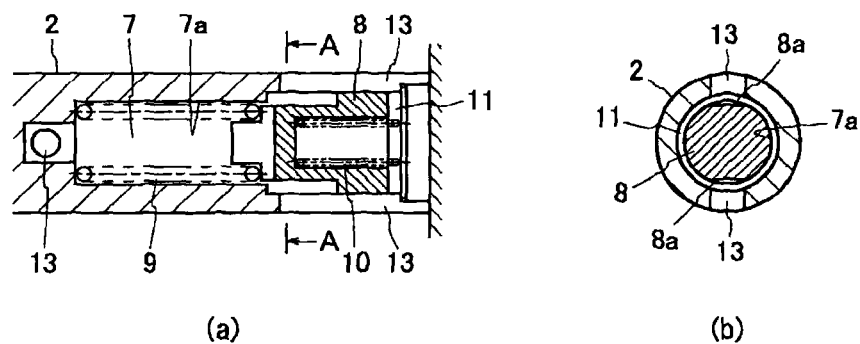

When the shaft 2 rotates in the clockwise direction in FIGS. 4 and 5, fluid in the second chamber 6b and fourth chamber 6d is pressed by the vanes 3, the fluid flows into the operating chamber 7 through the first passage 12. At that time, as shown in FIG. 11, the valve body 8 receives pressure of fluid which flowed into the operating chamber 7, this compresses the second spring 10, and the valve body 8 retreats from the natural state position. With this, the flow path 14 is eliminated, a large amount of fluid can pass through the operating chamber 7. Therefore, according to the rotary damper of the embodiment, when fluid flows backward in the operating chamber 7, the braking force can be made extremely small.

According to the embodiment, since the valve mechanism is provided in the shaft 2, it is possible to realize a small rotary damper in which a rotation angle of the vane 3 can sufficiently be secured and the outer diameter of the casing 1 is 20 mm or less.

Figure 13:
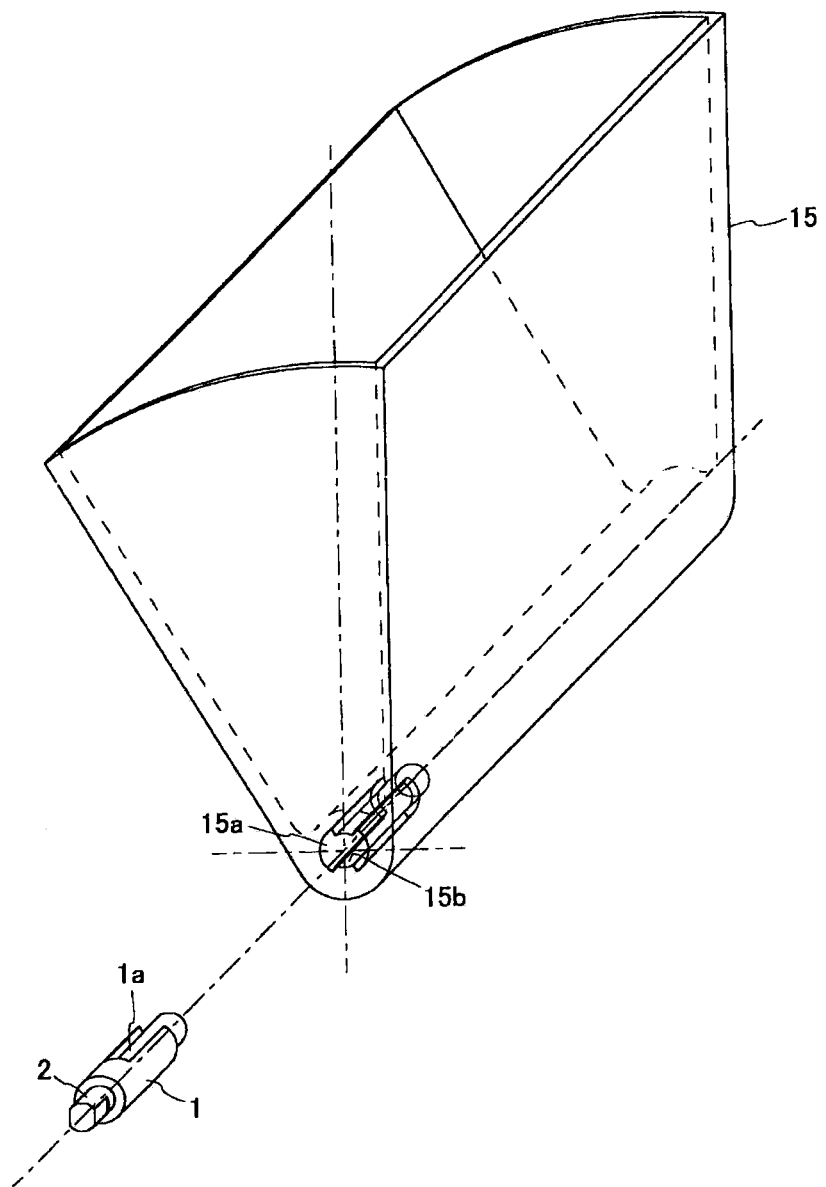
FIG. 13 is a schematic plan view showing one example of a product having the rotary damper of the first embodiment.

FIG. 13 is a schematic exploded perspective view showing an example in which the rotary damper of the embodiment is applied to a glove box disposed in an opening formed in an instrument panel of an automobile. The glove box includes a box body 15 as a movable body having an accommodation section capable of accommodating an article.

According to the rotary damper of the embodiment, the casing 1 and the division walls 4 are integrally formed by press working. A division wall forming section is formed with a recess 1a. Therefore, if a coupling section comprising the recess 1a is engaged with a bump 15b provided in a hole 15a formed such that the casing 1 can be inserted into the hole 15a in the box body 15 of the glove box, the casing 1 rotates around the shaft 2 in association with turning motion of the box body 15. Thus, it is unnecessary to interpose an arm or a gear between the box body 15 which is to be controlled, and the number of parts can be reduced. Since a transmitting member such as the arm or gear is not interposed, mechanical play can be reduced.

Second Embodiment

A rotary damper of a second embodiment is different from the rotary damper of the first embodiment in the shape of the valve body 8. That is, the valve body 8 of the second embodiment is provides at its outer periphery with a tapered surface 8b as shown in FIGS. 14 and 15.

Figure 14:
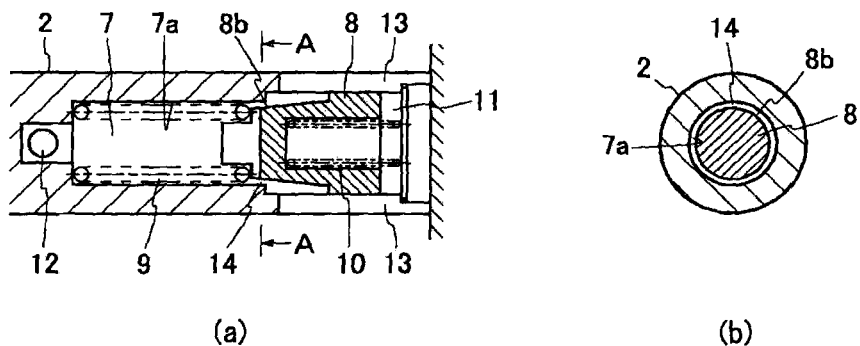
Figure 15:
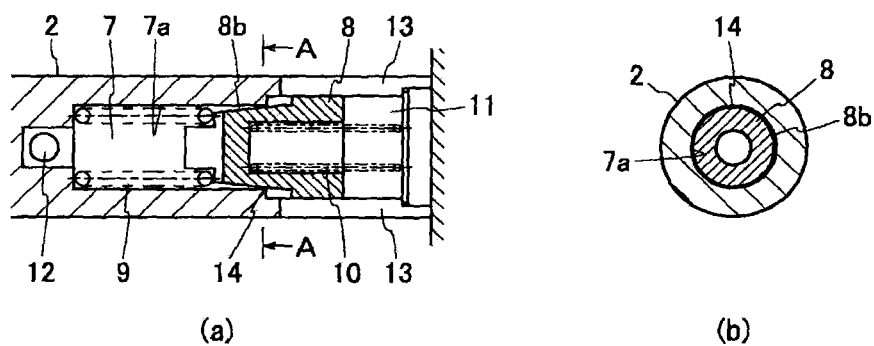

FIG. 14 shows a state before the valve body 8 forwardly moves in the operating chamber 7. FIG. 15 shows a state after the valve body 8 forwardly moves in the operating chamber 7. As shown in these drawings, according to the valve mechanism having such a valve body 8, as the moving distance of the valve body 8 which forwardly moves in the operating chamber 7 is increased, the area of the flow path 14 formed between the wall surface of the peripheral wall 7a of the operating chamber 7 and the tapered surface 8b formed on the valve body 8 is reduced. With this, the reducing amount can be increased. Thus, the second embodiment can also exhibit the same effect as that of the first embodiment.

Third Embodiment

Figure 16:
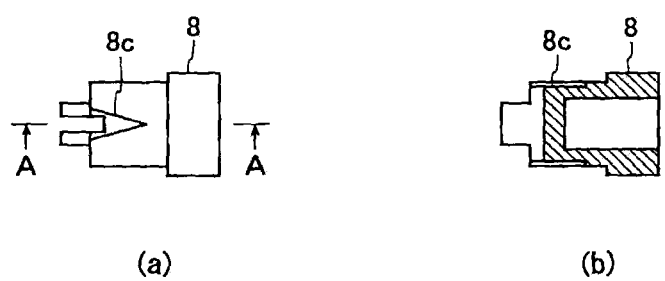

In a rotary damper of a third embodiment, the shape of the valve body 8 is different from that of the rotary damper of the first embodiment. That is, the valve body 8 of the third embodiment is provided at its outer periphery with a substantially V-shaped groove 8c as shown in FIG. 16.

According to the valve mechanism having such a valve body 8, as the moving distance of the valve body 8 which forwardly moves in the operating chamber 7 is increased, the area of the flow path 14 formed between the wall surface of the peripheral wall 7a of the operating chamber 7 and the groove 8c formed in the valve body 8 is reduced. With this, the reducing amount can be increased. Thus, the third embodiment can also exhibit the same effect as that of the first embodiment.

Fourth Embodiment

Figure 17:
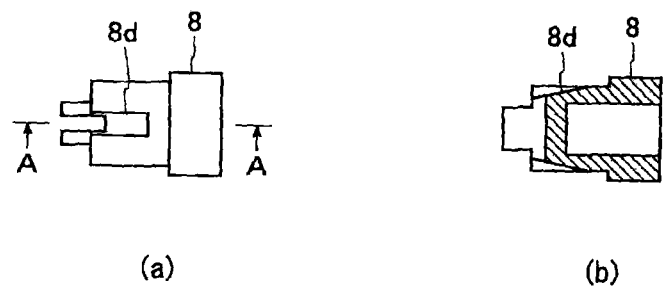

In a rotary damper of a fourth embodiment, the shape of the valve body 8 is different from that of the rotary damper of the first embodiment. That is, the valve body 8 of the fourth embodiment is provided at its outer periphery with a groove 8d whose bottom is a slope face as shown in FIG. 17.

According to the valve mechanism having such a valve body 8, as the moving distance of the valve body 8 which forwardly moves in the operating chamber 7 is increased, the area of the flow path 14 formed between the wall surface of the peripheral wall 7a of the operating chamber 7 and the groove 8d formed in the valve body 8 is reduced. With this, the reducing amount can be increased. Thus, the fourth embodiment can also exhibit the same effect as that of the first embodiment.

Fifth Embodiment

Figure 18:
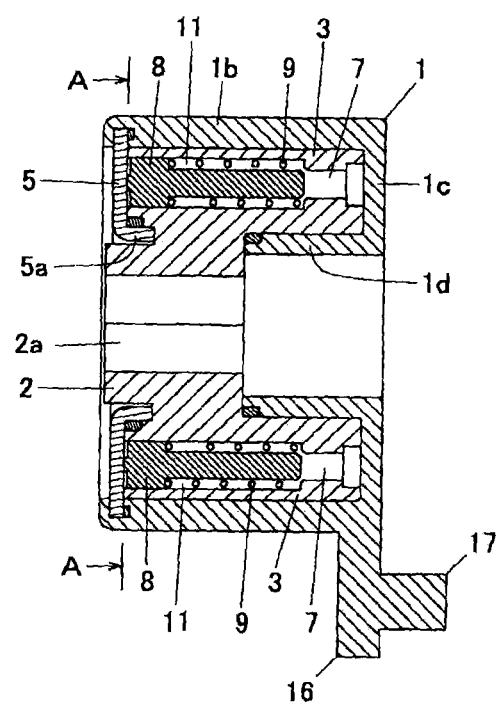
FIG. 18 is a sectional view showing an internal structure of a rotary damper of a fifth embodiment of the present invention.
Figure 19:
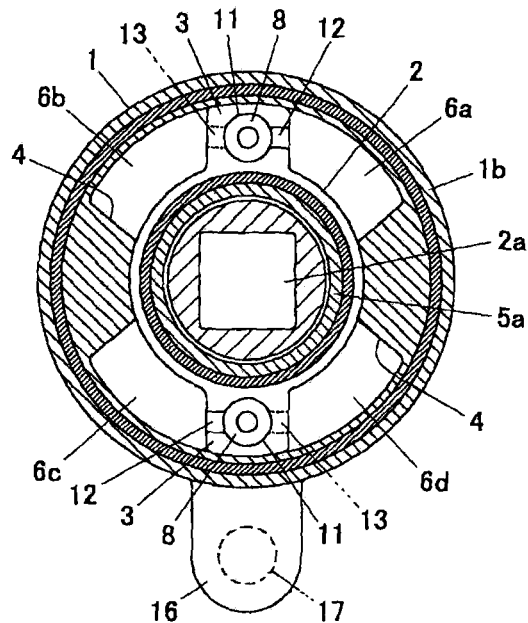
FIG. 19 is a sectional view taken along the line A-A in FIG. 18.

FIGS. 18 and 19 show a rotary damper according to a fifth embodiment of the present invention. As shown in these drawings, the rotary damper of the embodiment includes a casing 1, a shaft 2, vanes 3, division walls 4 and a valve mechanism.

The casing 1 comprises an outer wall 1b having a substantially circular cross section, an end wall 1c which intersects with the outer wall 1b at right angles, and a inner wall 1d which has a substantially circular cross section and which intersects with the end wall 1c at right angles (see FIG. 18). Here, the outer diameter of the inner wall 1d is smaller than an inner diameter of the outer wall 1b so that a space is formed between an outer peripheral surface of the inner wall 1d and an inner peripheral surface of the outer wall 1b opposed to the inner wall 1d. The length of the inner wall 1d in its axial direction is shorter than the length of the outer wall 1b in its axial direction.

The casing 1 is provided with a flange 16 which projects from the outer peripheral surface of the outer wall 1b. The flange 16 is provided with a projection 17. The projection 17 can function as a detent member of the casing 1.

The casing 1 is provided with two division walls 4 and 4 projecting from the inner peripheral surface of the outer wall 1b (see FIG. 19). The division walls 4 and 4 are opposed to each other with the shaft 2 interposed therebetween. A tip end surface of the division wall 4 is in contact with the outer peripheral surface of the shaft 2. The division walls 4 and 4 partition a space formed between the casing 1 and the shaft 2. Viscous fluid such as silicon oil is charged into the casing 1.

A lid 5 is a circular plate formed at its central portion with a hole, and a projection piece 5a projecting toward an inner surface of the lid 5 is formed around the hole (see FIG. 18). The later-described shaft 2, vanes 3, valve mechanism and the like are assembled and fluid is charged an then, the projection piece 5a is inserted into the groove formed in the shaft 2, and the lid 5 is set such as to close an opening formed in one end of the casing 1 and then, and end of the outer wall 1b is crimped. With this, the lid 5 is mounted (see FIG. 18). The lid 5 of the embodiment functions not only to tightly close the opening formed in the one end of the casing 1 but also to support the shaft 2 by fitting the projection piece 5a formed on the lid 5 into the groove formed in the shaft 2.

The shaft 2 is provided in the casing 1 such that the shaft 2 can rotate relative to the casing 1. The shaft 2 of the embodiment has a substantially circular cross section, and has a hole 2a passing through the shaft 2 in the axial direction. The hole 2a has a substantially rectangular cross section. The shaft 2 is integrally formed with two vanes 3 and 3. Four chambers 6a to 6d (a first chamber 6a to a fourth chamber 6d, hereinafter) are formed in the casing 1. The chambers 6a to 6d are divided by the division walls 4 and 4 and the vanes 3 and 3 (see FIG. 19).

Each vane 3 and 3 is provided with a valve mechanism. Here, the valve mechanism includes an operating chamber 7, a valve body 8 and a first spring 9 (see FIG. 18).

The operating chamber 7 is formed adjacent to a valve chamber 11 in which the valve body 8 is accommodated. The operating chamber 7 and the valve chamber 11 are holes having circular cross sections. The valve chamber 11 has an inner diameter greater than that of the operating chamber 7. The operating chamber 7 is in communication with the first chamber 6a and the third chamber 6c through a first passage 12, and is in communication with the second chamber 6b and the fourth chamber 6d through the valve chamber 11 and a second passage 13 (see FIG. 19). Therefore, fluid in the first chamber 6a and fluid in the second chamber 6b can move therebetween through the operating chamber 7 formed in one of the vanes 3, and fluid in the third chamber 6c and fluid in the fourth chamber 6d can move therebetween through the operating chamber 7 formed in the other vane 3.

Figure 20:
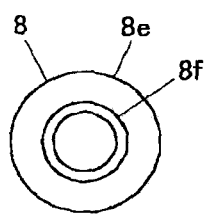
Figure 20:
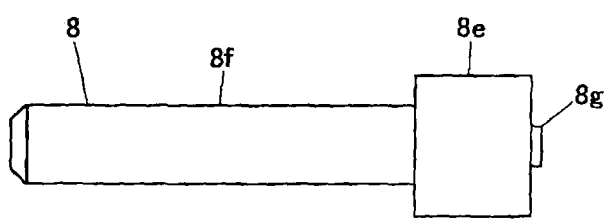

The valve body 8 is accommodated in the valve chamber 11 such that the valve body 8 can move along the shaft 2. The valve body 8 of the embodiment comprises a large-diameter portion 8e having an outer diameter smaller than an inner diameter of the valve chamber 11, and a small-diameter portion 8f having an outer diameter slightly smaller than an inner diameter of the operating chamber 7 (see FIG. 20). A projection portion 8g is formed on one end of the large-diameter portion 8e such that the projection portion 8g projects from the end surface of the end. The projection portion 8g prevents the first passage 12 from being closed by the large-diameter portion 8e.

When the valve body 8 forwardly moves from the natural state position and enters into the operating chamber 7 and the outer peripheral surface of the small-diameter portion 8f of the valve body 8 and the wall surface of the peripheral wall 7a of the operating chamber 7 are opposed to each other, the flow path 14 is formed therebetween. The flow path 14 is designed such that the flow path 14 reduces the flow rate of fluid passing through the operating chamber 7.

The first spring 9 comprises a compression coil spring. In the valve chamber 11, one end of the first spring 9 is supported by a boundary surface between the large-diameter portion 8e and the small-diameter portion 8f of the valve body 8, and the other end of the first spring 9 is supported by a boundary surface between the valve chamber 11 and the operating chamber 7. The first spring 9 is compressed when the valve body 8 forwardly moves, and pressure of the first spring 9 generated at that time is given to the valve body 8 as a resistance.

According to the rotary damper of the embodiment, when the casing 1 is disposed such that the casing 1 can not rotate, the shaft 2 rotates in the casing 1 to exhibit a braking force, and when the shaft 2 is disposed such that the shaft 2 can not rotate, the casing 1 rotates around the shaft 2 to exhibit a braking force. Such braking force can make the motion of the movable body to be controlled slower.

When the casing 1 is disposed such that it can not rotate, a connection shaft which rotates in association with motion of the movable body to be controlled is inserted through the hole 2a of the shaft 2, and the shaft 2 is connected to the connection shaft. With this, the shaft 2 rotates when the movable body to be controlled moves.

When the shaft 2 rotates in the clockwise direction in FIG. 19, fluid in the first chamber 6a and the third chamber 6c is pushed by the vanes 3 and the fluid flows into the valve chamber 11 through the first passage 12. The valve body 8 receives pressure flowing behind the valve body 8 and tries to move forward from the natural state position, but since the valve body 8 also receives a resistance from the first spring 9, the moving distance of the valve body 8 corresponds to the load. That is, if the load is great, the fluid pressure which forwardly moves the valve body 8 also becomes great and thus, the first spring 9 is largely compressed and the moving distance of the valve body 8 is increased. If the load is small on the other hand, since the fluid pressure which forwardly moves the valve body 8 also becomes small, the compression of the first spring 9 is small and the moving distance of the valve body 8 is also small.

Figure 21:
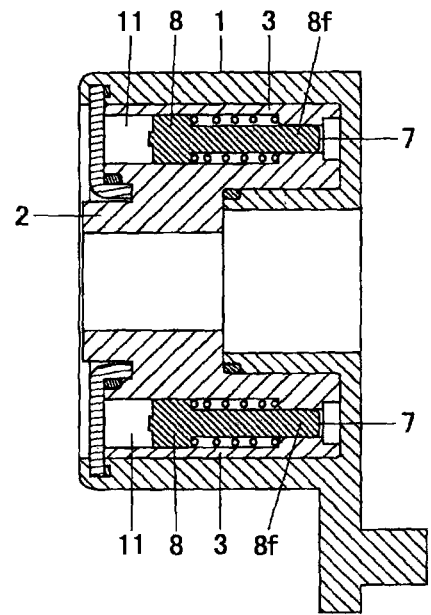
FIG. 21 is a diagram used for explaining the function of a valve mechanism employed in the fifth embodiment.
Figure 22:
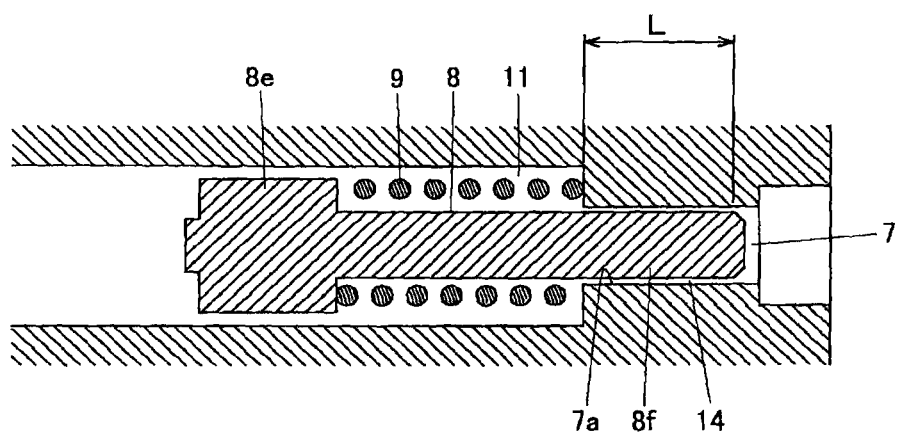
FIG. 22 is a diagram used for explaining the function of the valve mechanism employed in the fifth embodiment.

If the valve body 8 moves forward, as shown in FIG. 21, the small-diameter portion 8f of the valve body 8 enters the operating chamber 7. With this, the flow path 14 is formed between the outer peripheral surface of the small-diameter portion 8f and the wall surface of the peripheral wall 7a of the operating chamber 7 (see FIG. 22). Since the moving distance of the valve body 8 is varied in correspondence with variation in load, the length L of the flow path 14 is also varied in correspondence with the variation in the load. As the length L of the flow path 14 is increased, it becomes more difficult for fluid to flow and thus, the resistance of fluid pressed by the vanes 3 is increased. Therefore, according to the rotary damper of the embodiment, when the load is great, the length L of the flow path 14 is increased, the resistance of fluid is increased and thus, great braking force can be exhibited, and when the load is small on the other hand, the length L of the flow path 14 becomes short, the resistance of viscous fluid also becomes small and thus, small braking force can be exhibited. The fluid which passed through the operating chamber 7 flows into the second chamber 6b and the fourth chamber 6d through the second passage 13.

Figure 23:
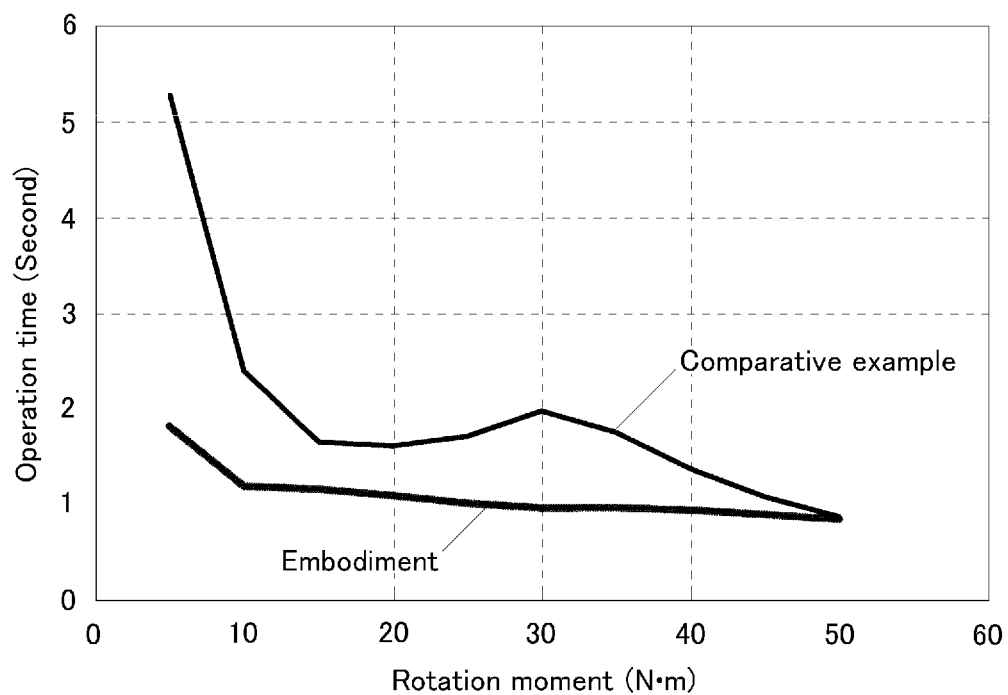
FIG. 23 is a graph for comparison between braking characteristics of the rotary damper of the fifth embodiment and braking characteristics of the conventional rotary damper (comparative example)

FIG. 23 is a graph showing a comparison between braking characteristics of the rotary damper (embodiment) according to the embodiment and braking characteristics of a conventional rotary damper (comparative example) having a valve body comprising a leaf spring. A vertical axis shows operation time when the movable body which is to be controlled rotates through a given angle (simply "operation time", hereinafter), and a horizontal axis shows rotation moment of the movable body (hereinafter simply called "rotation moment"). When the rotation moment is 50N·m, the operation time is the same in both the embodiment and the comparative example.

As shown in the graph, when the rotation moment is 5N·m, in the comparative example, since the straight distance between the opening of the fluid passage and the other surface of the valve body opposed to the opening is not so long from the beginning, it takes about 5.3 seconds to rotate the movable body to be controlled through a given angle. Whereas, in the embodiment, since a resistance of the first spring 9 is given to the valve body 8 and the moving distance of the valve body 8 is short, the operation time is about 1.8 seconds which is about one-third of the comparative example.

If the rotation moment becomes 10N·m, in the comparative example, the valve body is deformed, and the straight distance between the opening of the fluid passage and the other surface of the valve body becomes short. Therefore, the operation time is shortened to about 2.4 seconds. Whereas, in the embodiment, if the valve body 8 forwardly moves, the flow path 14 is formed between the valve body 8 and the peripheral wall 7a of the operating chamber 7. Thus, the operation time is shortened to about 1.2 seconds.

When the rotation motion is 15N·m, in the comparative example, the valve body is further deformed and the straight distance between the opening of the fluid passage and the other surface of the valve body becomes short. Thus, the operation time is shortened to about 1.7 seconds. If this is compared with the operation time when the rotation moment is 10N·m, its difference is about 0.7 seconds and it is largely varied. This is because that a degree of deformation of the valve body is large. Whereas, in the embodiment, if the valve body 8 further forwardly moves, the length of the flow path 14 is increased and thus, the operation time is shortened to about 1.17 seconds. However, if this is compared with the operation time when the rotation moment is 10N·m, its difference is only about 0.03 seconds and variation in operation time is extremely small.

When the rotation moment is 20 to 25N·m, in the comparative example also, there is almost no difference in the operation time as compared with a case in which the rotation moment is 15N·m like the embodiment.

If the rotation moment becomes 30N·m, however, in the comparative example, the valve body is abruptly deformed and the opening of the fluid passage is closed. Therefore, the operation time is abruptly increased. After the rotation moment exceeds 30N·m and before it reaches 50N·m, the state where the valve body closes the opening of the fluid passage is continued. Thus, the valve body does not function, fluid moves through a gap and the like formed between the vanes and the casing and this generates resistance in fluid, and this resistance gradually shortens the operation time. Whereas, in the embodiment, even if the rotation moment becomes 30N·m, the valve body 8 further forwardly moves and the length of the flow path 14 is increased, but since the flow path 14 itself is not closed, the operation time is not increased and is slightly shortened. After the rotation moment exceeds 30N·m and before it reaches 50N·m, the length of the flow path 14 is gradually increased by the further forward movement of the valve body 8. Therefore, the operation time is gradually reduced but variation in operation time with respect to the increase in rotation moment is extremely small.

According to the embodiment, as the moving distance of the valve body 8 which forwardly moves in the operating chamber 7 is increased, the length of the flow path 14 is increased, thereby increasing the reducing amount. Therefore, it is possible to increase the range of load to be substantially coped by function of the valve mechanism. Further, as the moving distance of the valve body 8 which forwardly moves in the operating chamber 7 is increased while receiving the resistance from the first spring 9, the reducing amount is increased. Thus, it is possible to exhibit a braking force which appropriately corresponds to the variation in load. Thus, it is possible to reduce, to an extremely small level, the variation in operation time with respect to the increase in rotation moment. Even if the rotary dampers are mass-produced, since it is possible to employ, as valve mechanisms, valve bodies 8 whose shape and size can easily be worked precisely, yields can be enhanced.

When the shaft 2 is rotated in the counterclockwise direction in FIG. 19, fluid in the second chamber 6b and the fourth chamber 6d is pushed by the vanes 3. With this, the fluid flows into the operating chamber 7 through the second passage 13. At that time, the valve body 8 returns to the natural state position by pressure of the first spring 9. As shown in FIG. 18, the small-diameter portion 8f is completely escaped from the operating chamber 7, the flow path 14 is not formed, the fluid passes through the operating chamber 7 without reducing the flow rate thereof, and the fluid flows into the first chamber 6a and the third chamber 6c.

Sixth Embodiment

Figure 24:
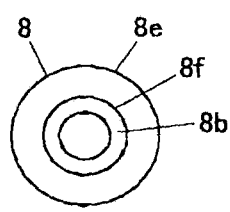
Figure 24:
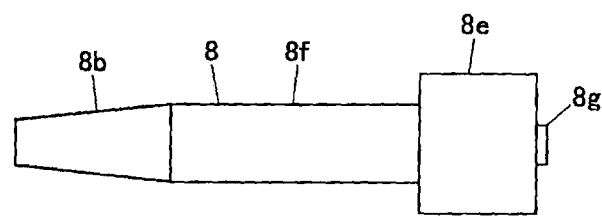

A rotary damper of a sixth embodiment is different from the rotary damper of the fifth embodiment in the shape of the valve body 8. That is, according to the valve body 8 of the sixth embodiment, the small-diameter portion 8f is formed with a tapered surface 8b as shown in FIG. 24.

Figure 25:
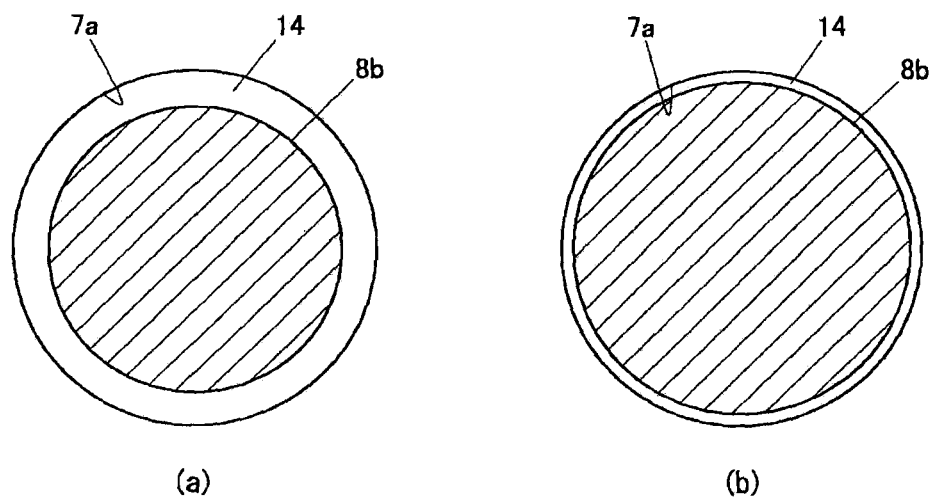
FIGS. 25(a) and 25(b) are diagrams used for explaining the function of a valve mechanism employed in the sixth embodiment.

According to the sixth embodiment, as the small-diameter portion 8f of the valve body 8 enters the operating chamber 7, an area of the flow path 14 formed between the tapered surface 8b of the small-diameter portion 8f and the wall surface of the peripheral wall 7a of the operating chamber 7 can be reduced. More concretely, when the load is small, since the area of the flow path 14 is large as shown in FIG. 25(a), the reducing amount can be reduced. On the other hand, when the load is large, since the small-diameter portion 8f of the valve body 8 deeply enters the operating chamber 7 as compared with a case where the load is small, the area of the flow path 14 is reduced as shown in FIG. 25(b) and the reducing amount can be increased.

The valve body 8 is formed with the tapered surface 8b and if the valve body 8 forwardly moves in the operating chamber 7, the area of the flow path 14 is reduced in this embodiment. With this configuration also, it is possible to exhibit a braking force corresponding to the variation in load, and the braking characteristics can be enhanced as compared with the conventional rotary damper.

The peripheral wall 7a of the operating chamber 7 may be formed with a tapered surface so that the area of the flow path 14 is reduced as the valve body 8 forwardly moves.

Seventh Embodiment

Figure 26:
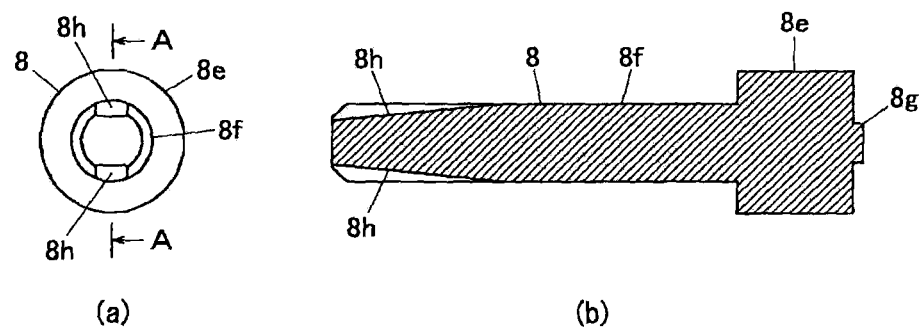

A rotary damper of a seventh embodiment is different from the rotary damper of the fifth embodiment in the shape of the valve body 8. According to the valve body 8 of the embodiment, as shown in FIG. 26, the small-diameter portion 8f is formed with a groove 8h. The depth of the groove 8h adjusted such that as the valve body 8 forwardly moves in the operating chamber 7, the area of the flow path 14 is reduced.

Figure 27:
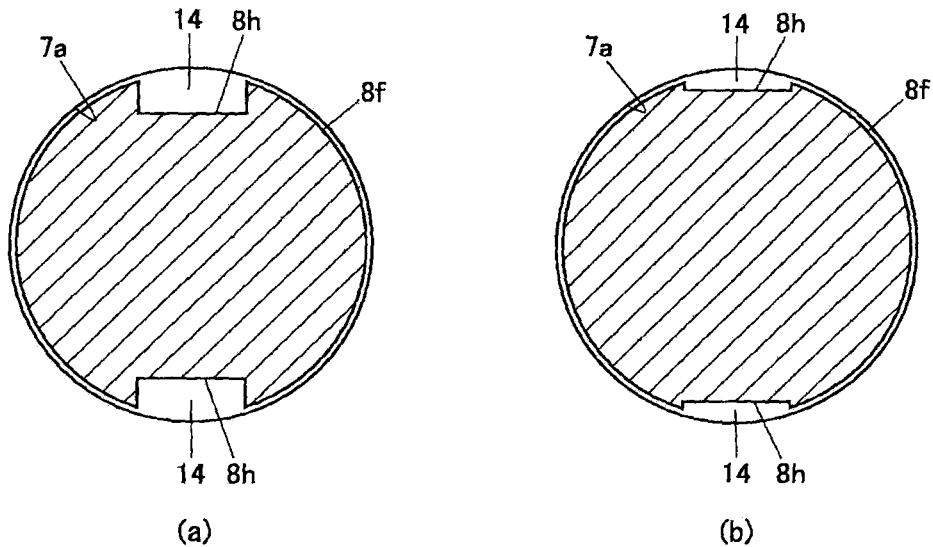
FIGS. 27(a) and 27(b) are diagrams used for explaining the function of a valve mechanism employed in the seventh embodiment.

According to the embodiment, as the small-diameter portion 8f of the valve body 8 enters the operating chamber 7, the area of the flow path 14 formed between the groove 8h formed in the valve body 8 and the wall surface of the peripheral wall 7a of the operating chamber 7 can be reduced. Thus, when the load is small, since the area of the flow path 14 is large as shown in FIG. 27(a), the reducing amount can be reduced. When the load is large, on the other hand, the small-diameter portion 8f of the valve body 8 enters the operating chamber 7 more deeply as compared with a case where the load is small. Thus, the area of the flow path 14 is reduced as shown in FIG. 27(a), and the reducing amount can be increased.

In this embodiment, the valve body 8 is formed with the groove 8h and the valve body 8 forwardly moves in the operating chamber 7, thereby reducing the area of the flow path 14. With this configuration also, a braking force corresponding to the variation in load can be exhibited, and the braking characteristics can be enhanced as compared with the conventional rotary damper.

The peripheral wall 7a of the operating chamber 7 may be formed with a groove such that as the valve body 8 forwardly moves in the operating chamber 7, the area of the flow path 14 is reduced.

Eighth Embodiment

Figure 28:
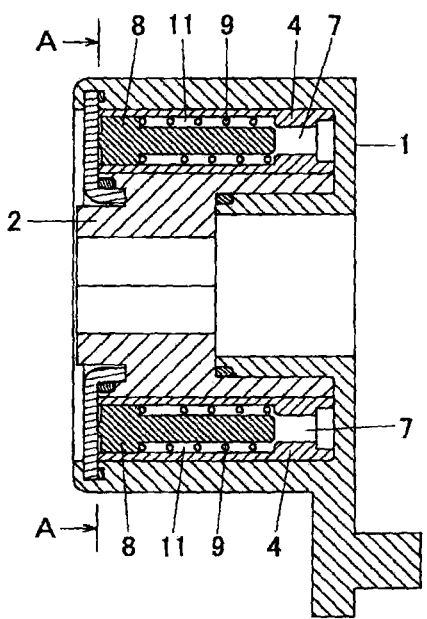
FIG. 28 is a sectional view showing an internal structure of a rotary damper of an eighth embodiment of the present invention.
Figure 29:
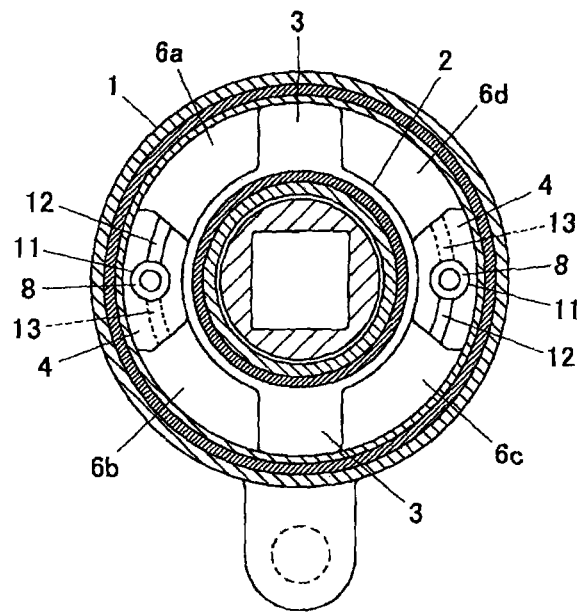
FIG. 29 is a sectional view taken along the line A-A in FIG. 28.
Figure 30:
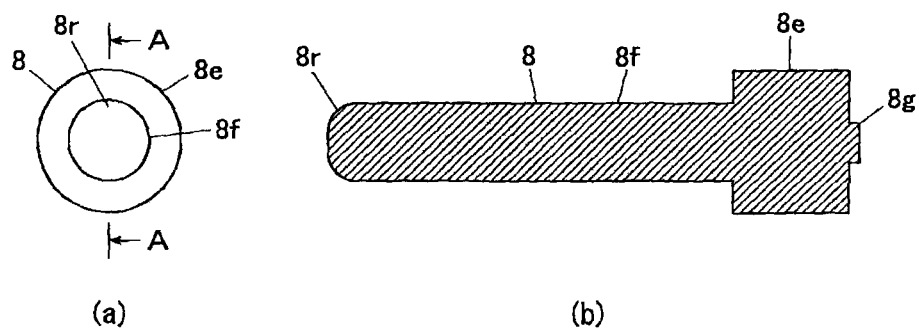

A rotary damper of an eighth embodiment is different from the rotary damper of the fifth embodiment in that the division wall 4 is provided with a valve mechanism. That is, in the eighth embodiment, as shown in FIGS. 28 and 29, each of the valve mechanisms includes the operating chamber 7, the valve body 8 and the first spring 9, and each of the two division walls 4 and 4 has the valve mechanism. The structure itself of the valve mechanism is the same as that of the fifth embodiment. Even if when the division wall 4 is provided with the valve mechanism as in this embodiment, the same effect as that when the vane 3 is provided with the valve mechanism can be obtained.

Ninth Embodiment

A rotary damper of a ninth embodiment is different from the rotary damper of the fifth embodiment in the shape of the valve body 8. That is, according to the valve body 8 of the embodiment shown in FIG. 30, an angle of a tip end of the small-diameter portion 8f at which an outer peripheral surface and an end surface intersect with each other is chamfered into a substantially arc shape in cross section (a chamfered portion is called "R", hereinafter, and in FIGS. 30 to 33, 8r is R).

According to the embodiment, even when a load is varied, as the moving distance of the valve body 8 which forwardly moves in the operating chamber 7 is increased, the area of the flow path 14 formed between the wall surface of the peripheral wall 7a of the operating chamber 7 and a surface of the R 8r formed on the valve body 8 can be reduced until the fluid pressure reaches a predetermined value.

Figure 31:
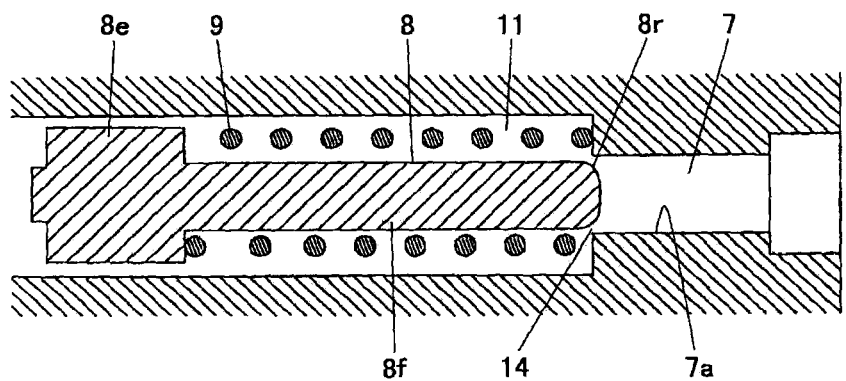
FIG. 31 is a diagram used for explaining the function of a valve mechanism employed in the ninth embodiment.
Figure 32:
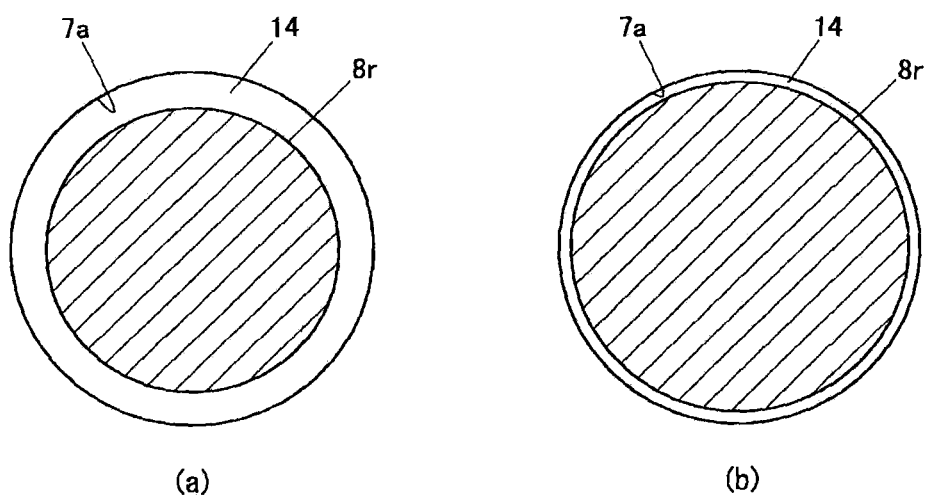
FIGS. 32(a) and 32(b) are diagrams used for explaining the function of the valve mechanism employed in the ninth embodiment.

More specifically, when the valve body 8 forwardly moves from the natural state position and the small-diameter portion 8f of the valve body 8 slightly enters the operating chamber 7, the flow path 14 is formed between a surface of the R 8r and the wall surface of the peripheral wall 7a of the operating chamber 7 (see FIG. 31). Here, since the R 8r has a substantially arc cross section, the flow path 14 at that time is large as shown in FIG. 32(a). Therefore, the reducing amount is small and the resistance of fluid is also small. If the fluid pressure which forwardly moves the valve body 8 becomes high and the valve body 8 further forwardly moves in the operating chamber 7, the area of the flow path 14 formed between the surface of the R 8r and the wall surface of the peripheral wall 7a of the operating chamber 7 becomes small. Thus, the reducing amount is increased and the resistance of fluid is also increased.

Even when the area of the flow path 14 is reduced, since the length of the flow path 14 is extremely short, fluid is prone to leak as compared with a case where the length of the flow path 14 is long with the same area. Therefore, when the fluid pressure which forwardly moves the valve body 8 is less than the predetermined value and the load is low, although a braking force corresponding to the variation in load is exhibited, the braking force can be reduced.

When the fluid pressure which forwardly moves the valve body 8 is equal to or higher than the predetermined value and the load is high, as the moving distance of the valve body 8 which forwardly moves in the operating chamber is increased the length of the flow path 14 formed between the wall surface of the peripheral wall 7a of the operating chamber 7 and the outer peripheral surface of the small-diameter portion 8f of the valve body 8 can be increased.

Figure 33:
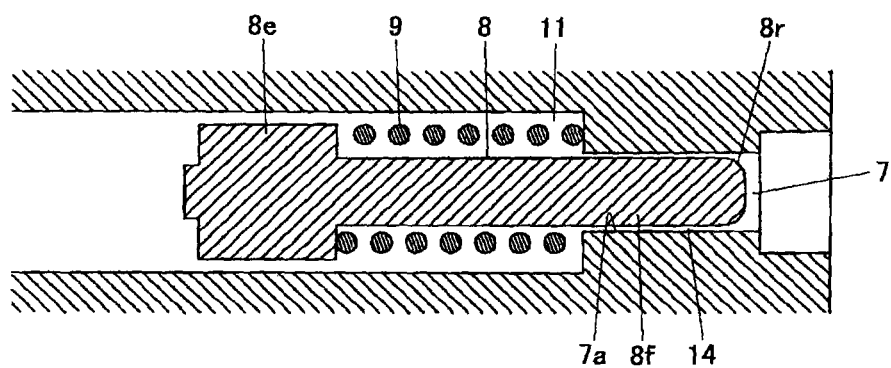
FIG. 33 is a diagram used for explaining the function of the valve mechanism employed in the ninth embodiment.

More specifically, when the fluid pressure which forwardly moves the valve body 8 becomes equal to or higher than the predetermined value, the valve body 8 further forwardly moves in the operating chamber 7, and the flow path 14 is formed between the outer peripheral surface of the small-diameter portion 8f of the valve body 8 and the wall surface of the peripheral wall 7a of the operating chamber 7 (see FIG. 33). As the load becomes greater, the moving distance of the valve body 8 is more increased. Therefore, as the load becomes greater, the length of the flow path 14 is more increased. Since fluid becomes more difficult to flow as the length of the flow path 14 is increased, the reducing amount is increased if the length of the flow path 14 is increased. Thus, when the fluid pressure which forwardly moves the valve body 8 is equal to or higher than the predetermined value and the load is high, although a braking force corresponding to the variation of load is exhibited, the braking force can be increased.

According to the embodiments, even when the rotation moment of the movable body which is to be controlled is varied, variation of the operation time can be reduced.

INDUSTRIAL APPLICABILITY

The rotary damper of the present invention can be applied to various products having movable bodies. Even when the rotation moment is varied with respect to a movable body whose rotation moment is varied, it is possible to control such that the operation speed is not varied. Therefore, the rotary damper is effective for controlling vertical motion of an accommodation shelves of a integrated kitchen system, vertical motion of a seat of an automobile, rotation motion of a seat back or a reclining seat, opening and closing motion of a lid or a door, and the like.

The invention claimed is:

1. A rotary damper comprising a valve mechanism, wherein the valve mechanism comprises
    an operating chamber through which fluid can pass,
    a valve chamber formed adjacently to the operating chamber,
    a valve body which is placed in the valve chamber, and a first spring mounted in the operating chamber, wherein the damper is structured and arranged to apply fluid pressure behind the valve body which increases in proportion to a load, wherein the valve body is structured and arranged to move forward into the operating chamber upon receiving the pressure of the fluid, wherein the first spring is structured and arranged to provide a resistance to the forward movement of the valve body so that the valve body moves according to the pressure of the fluid, wherein the valve mechanism further comprises a flow path which is formed by the forward movement of the valve body, wherein the flow path is formed between an inner peripheral surface of a peripheral wall of the operating chamber and an outer peripheral surface of the valve body by the forward movement of the valve body, wherein the damper is structured and arranged such that the fluid moves only through the flow path when the valve body is moving from the valve chamber to the operating chamber, wherein an area of the flow path becomes smaller as the valve body moves forwardly.

2. The rotary damper according to claim 1, wherein the valve mechanism further comprises a second spring which is placed behind the valve body, and wherein the second spring is structured and arranged to return the valve body to a natural state position which is a position where the valve body exists when no load is applied.

3. The rotary damper according to claim 1, further comprising a pushing member which pushes the fluid by rotational motion, a partitioning member which partitions a space into which fluid is charged, and a shaft around which the pushing member or the partitioning member is provided, wherein the valve mechanism is provided in the shaft.

4. The rotary damper according to claim 1, further comprising a pushing member which pushes the fluid by rotational motion, and a partitioning member which partitions a space into which fluid is charged, wherein the valve mechanism is provided in the pushing member or the partitioning member.

5. A product comprising a movable body and a rotary damper which controls motion of the movable body, wherein the rotary damper is that described in any one of claims 1 to 4.

* * * * *